United States Patent [19]  [11] 4,211,853
Raley, Jr.  [45] * Jul. 8, 1980

[54] FLAME RETARDANT HALOHYDROCARBON POLYMER COMPOSITION

[75] Inventor: Charles F. Raley, Jr., Midland, Mich.

[73] Assignee: The Dow Chemical Company, Midland, Mich.

[ * ] Notice: The portion of the term of this patent subsequent to Apr. 25, 1995, has been disclaimed.

[21] Appl. No.: 929,619

[22] Filed: Jul. 31, 1978

Related U.S. Application Data

[63] Continuation of Ser. No. 765,142, Feb. 3, 1977, abandoned, which is a continuation-in-part of Ser. No. 168,756, Aug. 3, 1971, abandoned, which is a continuation-in-part of Ser. No. 53,332, Jul. 8, 1970, abandoned.

[51] Int. Cl.$^2$ ............................................. C08K 3/02
[52] U.S. Cl. ............................. 525/317; 260/45.7 P; 260/DIG. 24; 521/85; 521/106; 521/134; 521/139; 521/907; 525/288

[58] Field of Search ................ 521/85, 106, 134, 139, 521/907; 260/884, 45.7 P, 45.7 PE

[56] References Cited

U.S. PATENT DOCUMENTS

| | | | |
|---|---|---|---|
| 3,269,963 | 8/1966 | Ilegmann et al. | 260/2.5 FP |
| 3,321,416 | 5/1967 | Rausenback et al. | 260/2.5 FP |
| 3,326,832 | 6/1967 | Rausenback et al. | 260/2.5 FP |
| 3,470,116 | 9/1969 | Praetzel et al. | 260/2.5 FP |
| 3,574,149 | 4/1971 | Harrington | 260/2.5 FP |
| 3,655,589 | 4/1972 | Wingler et al. | 260/2.5 FP |
| 4,086,192 | 4/1978 | Raley, Jr. | 521/85 |

FOREIGN PATENT DOCUMENTS 1028553  5/1966  United Kingdom ............... 260/2.5 FP

*Primary Examiner*—Morton Foelak

[57] ABSTRACT

Normally flammable halohydrocarbon polymer compositions containing combustible plasticizer are rendered flame-retardant or self-extinguishing by incorporating therein elemental phosphorus having a specific gravity greater than two.

5 Claims, No Drawings

FLAME RETARDANT HALOHYDROCARBON POLYMER COMPOSITION

CROSS-REFERENCES TO RELATED APPLICATIONS

This is a continuation of Ser. No. 765,142, filed Feb. 3, 1977, now abandoned, which in turn is a continuation-in-part of Ser. No. 53,332, filed July 8, 1970, now abandoned, and a continuation-in-part of Ser. No. 168,756, filed August 3, 1971, now abandoned.

BACKGROUND OF THE INVENTION

This invention relates to halohydrocarbon polymer compositions which contain combustible plasticizers or plasticizing modifier.

The use of halohydrocarbon polymers in the fabrication of rigid moldings, housings, and insulation for electrical appliances and so forth is widespread. Such halohydrocarbon polymers such as polyvinyl chloride are normally self-extinguishing. However, it is often desirable, in order to achieve the desired molding characteristics of the polymer and flexibility of the resultant article, to incorporate therein a significant amount of plasticizer. Characteristically, these plasticizers are combustible and therefore significantly impair the inherent self-extinguishing characteristics of the halohydrocarbon polymer. In fact, the amount of plasticizer normally required to produce the desired molding characteristics and article flexibility generally renders the resultant halohydrocarbon polymer composition flammable or causes such a significant loss of fire retardance that the composition does not pass standard flame retardance tests required in the manufacture of plastic articles.

In recent times, it has become increasingly important to impart flame resistance properties to these plasticized halohydrocarbon polymers. This is particularly true where the plasticized halohydrocarbon polymers are used as insulating materials in the electrical industry and to prevent the risk of fire in the daily use of other items.

It has been proposed heretofore to impart flame retardancy to such flammable halohydrocarbon polymers by incorporating various additives into the polymer. Flame retardance has been obtained, for instance, by combining the polymer containing the plasticizer with a flame retardant inorganic oxide, preferably antimony oxide.

In view of the relatively high cost, the possible ecological hazards of antimony oxide, and the substantial amount by weight which must be employed to achieve the desired degree of fire retardancy in such flammable halohydrocarbon polymer compositions, it would be highly desirable to provide a more economical and non-toxic means for rendering normally flammable halohydrocarbon polymer compositions flame retardant or self-extinguishing.

SUMMARY OF THE INVENTION

The present invention is an improved fire retardant halohydrocarbon polymer composition comprising (1) a normally flammable plasticized halohydrocarbon polymer composition, and (2) a fire retarding amount of elemental phosphorus having a specific gravity greater than two.

As contrasted with prior art flame retardant halohydrocarbon polymer compositions containing a nonflammable oxide or oxychloride of antimony, bismuth and arsenic, the compositions of the present invention contains elemental phosphorus which per se burns readily. Therefore, it is surprising that the composition of the present invention has flame retardant or self-extinguishing characteristics comparable to conventional flame retardant or self-extinguishing halohydrocarbon polymers which contain antimony oxide. While this invention as claimed is limited only as to the ingredients of the flame retardant compositions as set forth herein and not to any particular theory, it is believed that, upon exposing the composition of the present invention to open flame, the elemental phosphorus combines with halogen supplied by the halohydrocarbon polymer to form a halide or oxyhalide of phosphorus which suppresses further combustion.

In addition to flame retardancy, this composition retains essentially all of the desirable physical characteristics of the plasticized halohydrocarbon polymer and is accordingly a further improvement over prior art compositions. In addition, the residues of the compositions of the present invention are non-toxic. Therefore, such compositions are utilized in applications which conventionally employ halohydrocarbon polymers in their modified or unmodified states. Illustratively, such applications include solid halohydrocarbon polymers for use in insulation and jacketing of electrical cables and the like; foamed halohydrocarbon polymers for use in construction, housings and insulation for electrical appliances, packaging, molded parts, cushioning, and the like.

For the purposes of this invention, the term "normally flammable halohydrocarbon polymer compositions" means a composition comprising a halohydrocarbon polymer and a combustible plasticizer which composition burns for a measurable period of time after ignition and removal of the ignition means. Such compositions are generally those which do not self-extinguish within one second upon removal of the ignition means, i.e., flame, therefrom and which exhibit improved flame retardance as a result of the incorporation of elemental phosphorus.

DESCRIPTION OF THE PREFERRED EMBODIMENTS

Representative halohydrocarbon polymers are the resinous homopolymers and copolymers of ethylenically unsaturated, addition polymerizable monomers containing substituent halogen and hydrocarbon polymers which have been subsequently halogenated. Illustrative of such monomers having substituent halogen are the vinyl and vinylidene halides such as vinyl chloride, vinylidene chloride and vinyl bromide. Of particular interest are the homopolymers and copolymers of vinyl chloride and other copolymerizable ethylenically unsaturated monomers such as monovinylidene carbocyclic aromatic monomers, e.g, methylchlorostyrene, vinyl toluene, t-butylstyrene, chlorostyrene; unsaturated esters of saturated aliphatic carboxylic acids such as vinyl acetate; aliphatic olefins such as ethylene and propylene; alkyl esters of $\alpha,\beta$-ethylenically unsaturated carboxylic acids such as ethyl acrylate, methyl methacrylate; $\alpha,\beta$-ethylenically unsaturated carboxylic acid such as acrylic acid and methacrylic acid and other copolymerizable ethylenically unsaturated monomers. Also of particular interest in the present invention are homopolymers and copolymers of vinylidene chloride with the foregoing monomers. Examples of suitable halogenated hydrocarbon polymers are chlorinated polyethylene and chlorinated polypropylene. In the halohydrocarbon copolymers employed in the practice of the present invention, the halohydrocarbon monomer or monomers preferably constitute at least about 85 weight percent of the polymer, especially at least 90 weight percent. In the halogenated hydrocarbon polymers, halogen content is generally in the range from about 15 to 70 weight percent based on the polymer.

For the purposes of this invention, the term "plasticized" halohydrocarbon polymer shall mean polymers that are made easier to fabricate into articles having increased flexibility by (1) incorporating external plasticizer into the polymer, or (2) including plasticizing monomer in the polymer and then polymerizing, or (3) copolymerizing plasticizing comonomer with a halohydrocarbon monomer. These latter two techniques are considered to be plasticization with internal plasticizers. The term "external combustible plasticizer" shall include those materials which, when incorporated into halohydrocarbon polymers such as polyvinyl chloride, enhance the ease of compounding such polymers, increase the flexibility and reduce the fire resistance of articles fabricated of such polymers. Examples of such external plasticizers include the aliphatic esters of dicarboxylic acid or fatty acid such as the dialkyl phthalates, e.g., dioctyl phthalate and diisodecyl phthalate; dialkyl adipates, e.g., dioctyl adipate and diisobutyl adipate; and dialkyl sebacates, e.g., dibutyl sebacate; azelaic acid esters; esters of fatty acids, e.g., butyl oleate, butyl stearate and the like. Also included are the trialkyl phosphates and other conventional plasticizers for polyvinyl chloride.

Also included as plasticizers are monomers which are often combined with the halohydrocarbon polymer to form polymerizable plastisols which are subsequently fused and polymerized. Exemplary monomer include the monovinylidene aromatics such as styrene, vinyl toluene and chlorostyrene; ester monomers such as the alkyl acrylates, e.g., butylene glycol dimethacrylate, ethyl acrylate and the like. Exemplary plasticizing comonomers include monomers such as vinyl acetate, ethyl acrylate and others which are copolymerizable with the halohydrocarbon monomer.

Generally, the plasticizer, whether external or internal, is present in the halohydrocarbon polymer in amounts sufficient to impair the fire resistant characteristics of the base polymer. Usually, such amounts are in the range from about 10 to about 250 weight parts per hundred weight parts of the polymer, especially from about 20 to about 100 parts.

The term "elemental red phosphorus" as used herein, refers to the colored allotropic forms of elemental phosphorus having specific gravity greater than 2.0. Specifically the term includes red phosphorus having specific gravity of about 2.34, black phosphorus having a specific gravity of about 2.70, and violet phosphorus having a specific gravity of about 2.36, all being described in the *Handbook of Chemistry and Physics*, 48th Ed., The Chemical Rubber Company, b-203 (1967–68). Also included are the mixtures of the red, black and/or violet forms. Red phosphorus which is usually a brownish-red powder of rhombohedral crystals and which is insoluble in water and carbon disulfied and is both non-poisonous and non-luminous is preferred. Especially preferred are powders of such red phosphorus having particle size less than about 200 microns, especially those less than about 150 microns. Generally, amounts of the red phosphorus that are effective to improve flame retardance of the halohydrocarbon composition are suitably employed. Illustratively, from about 0.5 to about 20 weight parts of elemental phosphorus per hundred parts of polymer are employed, especially from about 1 to about 10 weight parts. The atomic ratio of phosphorus to halogen is preferably from about 4:1 to about 1:6, especially from about 2:1 to about 1:3.

In addition to the foregoing ingredients, generally minor amounts, preferably up to about 25 weight parts per hundred weight parts of the halohydrocarbon polymer, of additives such as dyes, stabilizers exclusive of carbon black, fillers, blowing agents, reinforcing materials such as metallic fibers or particles and the like which are chemically inert to the elemental phosphorus can also be incorporated into the halohydrocarbon polymer, but are not required in the practice of this invention. In some cases, up to 100 weight parts of fillers per 100 weight parts of polymer may be employed. In addition to the foregoing additives, one or more of the halogenated organic compounds described in copending application Ser. No. 168,756 may also be incorporated although such are not required.

In making the improved halohydrocarbon polymer compositions in accordance with this invention, the elemental phosphorus and the combustible plasticizer are incorporated separately or as a mixture thereof into the polymer by dry-blending the additive ingredients with granular or powdered polymer and feeding the resultant mixture of the polymer and additives through a plastic extruder, or by mixing the additives and polymer on a hot roll mill or in a Banbury mixer or by some other conventional technique for incorporating solid additives into plastic polymers.

The resultant composition can subsequently be formed into the solid or foamed part or parts by conventional halohydrocarbon polymer forming techniques.

The following examples illustrate ways in which the principle of the invention has been applied, but are not to be construed as limiting its scope. All parts and percentages are by weight unless otherwise indicated.

EXAMPLE 1

One hundred parts of granular polyvinylchloride together with 60 parts of dioctyl phthalate and 5 parts of elemental red phosphorus are compounded thoroughly on a laboratory mill of the Banbury type at temperatures about 140°–150° C. and then reintroduced, such that entire mass is plastified and apparently homogeneous. The resulting samples are compression molded into test bars at temperatures of 140°–180° C. The resulting test bars ($\frac{5}{8}'' \times \frac{1}{8}'' \times \frac{1}{8}''$) are tested for self-extinguishing properties according to the test method employed in Example 2 of Ser. No. 168,756. The test bars exhibit an average self-extinguishing time of 2.9 seconds. Control test bars similar to the preceding ones except containing no phosphorus exhibit an average self-extinction time of 6.5 seconds. In these compositions of polyvinylchloride, the tendency to flammability is contributed by the plasticizer, dioctyl phthalate, since polyvinylchloride containing no dioctyl phthalate self-extinguishes immediately.

EXAMPLE 2

In accordance with the procedure of Example 1, test bars of chlorinated polyethylene (37% Cl) containing two parts of diglycidyl ether of bisphenol-A and 5 parts of elemental red phosphorus per 100 parts of polymer are prepared and tested for fire retardancy. The test bars exhibit an average self-extinguishing time of less than 1 second. Test bars similar to preceding ones except containing no phosphorus burned. In these compositions of the chlorinated polyethylene, the tendency to flammability is promoted by presence of the diglycidyl ether.

EXAMPLE 3

A series of polymerization recipes containing polyvinylchloride and various monomeric materials and other additives as set forth in the following Table I are polymerized using 0.5 parts of dicumyl peroxide and 0.5 part of benzoyl peroxide by pouring the polymerizable mixture into a mold (6"×6"×⅛") and heating to 138°–150° C. for a period of 2-3 minutes.

TABLE I

| Sample No. | Monomer Type | Amount, % | % PVC | % CaCO$_3$ | Red P[1] | Other Additive Type | Amount pph[1] |
|---|---|---|---|---|---|---|---|
| 1 | VT-MCS[a] | 30.5 | 25 | 44.5 | 3 | | |
| 2 | VT-MCS[a] | 30.5 | 25 | 44.5 | 1 | | |
| 3* | VT-MCS[a] | 30.5 | 25 | 44.5 | 0 | | |
| 4* | chlorostyrene | 30.5 | 25 | 44.5 | 0 | | |
| 5 | chlorostyrene | 30.5 | 25 | 44.5 | 1 | | |
| 6* | styrene | 55 | 45 | — | 0 | | |
| 7 | styrene | 55 | 45 | — | 1 | | |
| 8* | vinyl toluene | 60 | 40 | — | 0 | | |
| 9 | vinyl toluene | 60 | 40 | — | 1 | | |
| 10* | VT-MCS[a] | 30.5 | 25 | 44.5 | — | P-C[b] | 1 |
| 11* | VT-MCS[a] | 30.5 | 25 | 44.5 | — | P-C[b] | 3 |
| 12* | VT-MCS[a] | 30.5 | 25 | 44.5 | — | Triphenyl phosphine | 1 |
| 13* | VT-MCS[a] | 30.5 | 25 | 44.5 | — | Triphenyl phosphate | 1 |
| 14* | VT-MCS[a] | 30.5 | 25 | 44.5 | — | Antimony oxide | 3 |

*Not an example of invention.
[a]Monomer mixture containing 34.8 parts vinyltoluene (VT), 38.2 parts chlorostyrene (MCS), 7.3 parts dibutyl fumarate, 2.7 parts ethylene glycol dimethacrylate, 10 parts propylene glycol oleate, and 6.4 parts divinyl benzene.
[b]Ammonium polyphosphate having a phosphorus content of 32%.
[1]Parts per hundred parts of combined monomer, polyvinyl chloride and calcium carbonate.

The resulting test sheets are removed from the mold, cut into bars (½"×6"×⅛"), and tested for flame retardance using Underwriter's Lab Standard Test No. 94 and the results are recorded in Table II. For the purposes of comparison, several compositions are prepared using no phosphorus, forms of phosphorus other than elemental phosphorus and antimony oxide as listed in Table I. In a similar manner, the resulting polymers are recovered, formed into test bars, tested for self-extinguishing properties, in accordance with the foregoing procedures and the results are recorded in Table II.

TABLE II

| Sample No. | % Cl | % Phosphorus | UL-94[1] |
|---|---|---|---|
| 1 | 17.2 | ~3 | Pass |
| 2 | 17.2 | ~1 | Pass |
| 3* | 17.2 | 0 | Fail |
| 4* | 21 | 0 | Fail |
| 5 | 21 | ~1 | Pass |
| 6* | 25.6 | 0 | Fail |
| 7 | 25.6 | ~1 | Pass |
| 8* | 22.7 | 0 | Fail |
| 9 | 22.7 | 1 | Pass |
| 10* | 17.2 | ~0.32 | Fail |

TABLE II-continued

| Sample No. | % Cl | % Phosphorus | UL-94[1] |
|---|---|---|---|
| 11* | 17.2 | ~0.96 | Fail |
| 12* | 17.2 | ~0.1 | Fail |
| 13* | 17.2 | ~0.1 | Fail |
| 14* | 17.2 | 0 | Fail |

*Not an example of this invention
[1]Underwriters Standard Test No. 94

What is claimed is:

1. A halohydrocarbon polymer composition consisting essentially of (1) a halohydrocarbon polymer plasticized with from about 10 to about 250 weight parts of at least one polymerizable combustible monomer, said plasticized polymer being normally flammable, and (2) elemental red phosphorus having a specific gravity greater than two, said phosphorus being present in a flame retarding amount in the range from about 0.5 to about 20 weight parts, both of said weight parts being based on 100 weight parts of the halohydrocarbon polymer.

2. The composition of claim 1 wherein the halohydrocarbon polymer is selected from the group consisting of chlorinated polyethylene containing from about 15 to about 70 weight percent chlorine; chlorinated polypropylene containing from about 15 to about 70 weight percent chlorine; a homopolymer of a halohydrocarbon monomer selected from vinyl chloride, vinyl bromide and vinylidene chloride; or a copolymer of at least 85 weight percent of said halohydrocarbon monomer and the combustible monomer is a monovinylidene aromatic monomer, alkyl acrylate or vinyl acetate.

3. The composition of claim 2 wherein the combustible monomer is a monovinylidene aromatic monomer.

4. The composition of claim 2 wherein the halohydrocarbon polymer is a homopolymer or copolymer of vinyl chloride, vinyl bromide or vinylidene chloride.

5. The composition of claim 2 wherein the halohydrocarbon polymer is polyvinyl chloride and the combustible monomer is styrene.

* * * * *

UNITED STATES PATENT AND TRADEMARK OFFICE
CERTIFICATE OF CORRECTION

PATENT NO. : 4,211,853
DATED : July 8, 1980
INVENTOR(S) : Charles F. Raley, Jr.

It is certified that error appears in the above-identified patent and that said Letters Patent are hereby corrected as shown below:

Column 4, line 51, delete (5/8" x 1/8" x 1/8") and insert
--(5/8" x 1/8" x 8")--.

Signed and Sealed this

Sixteenth Day of December 1980

[SEAL]

Attest:

SIDNEY A. DIAMOND

*Attesting Officer*  *Commissioner of Patents and Trademarks*